Dec. 19, 1967

T. E. BUTLER 3,359,140

SUPPRESSION OF FUMES GENERATED IN FUME GENERATING
METAL REMOVAL PROCESSES

Filed July 19, 1965

INVENTOR
THOMAS E. BUTLER

BY

ATTORNEY

United States Patent Office 3,359,140
Patented Dec. 19, 1967

3,359,140
SUPPRESSION OF FUMES GENERATED IN FUME GENERATING METAL REMOVAL PROCESSES
Thomas E. Butler, Chatham, N.J., assignor to Union Carbide Corporation, a corporation of New York
Filed July 19, 1965, Ser. No. 473,019
11 Claims. (Cl. 148—9)

The present invention relates to a process for the suppression of fumes generated in the removal of selected portions of metal by fume generating metal removal processes. A particular embodiment of this invention relates to a novel method for the suppression of fumes generated in the removal of selected portions of metal by the plasma-arc process.

In metal working industries, considerable effort is devoted to the removal of selected portions of metal from a parent metal or workpiece. Depending on particular requirements, such removal may be accomplished by such processes as scarfing, gouging, piercing, cutting and severing. Considerable advances have been made in the metal working industry in the direction of increasing the amount of metal removed per unit of time. These advances have been derived from the development of the well known plasma-arc process. In general, a plasma-arc comprises a gas and an electric-arc. The gas is introduced into the electric-arc to combine with the arc to form a plasma; the plasma thus generated is then constricted in a confined area to produce an effluent characterized by its stability, high inertia, high energy per unit of area as well as extremely high temperatures. The effluent generated by a plasma-arc may be the plasma-arc itself as in a transferred arc, as well as an effluent which is disassociated in space from the actual plasma-arc such as in nontransferred arcs. When cutting of metal is desired, the plasma-arc effluent is brought to bear on an area of a workpiece and rapidly heats and melts the area effecting the removal of metal.

While the development of high temperature, high energy intensity processes for removal of metal, such as the plasma-arc process, has accelerated the rate of metal removal, these processes often produce large quantities of fumes. While the reason for the fumes is not altogether clear, the following is a theorization of their nature and origin. Initially, the fumes appear to be oxides of removed metal. With processes such as the plasma-arc, the removed metal leaves the workpiece in very small discrete particles at elevated temperatures. The temperature and large surface area per unit of volume of these particles combine to produce conditions ripe for their rapid oxidation with oxidizing agents such as gases in the surrounding atmosphere. Such gases may be oxygen contained in the ambient air, or reactive gases contained in the effluent, such as oxygen, which are used to expedite material removal. The term "oxidation," therefore, as used in this specification and the appended claims is to be taken generically and not limited to chemical combinations with oxygen. In contrast, with the exception of iron powder cutting, oxygen-fuel cutting processes do not generate fumes to any appreciable extent; this is attributed to the relatively low temperature and small surface area per unit of volume of the removed metal.

Because the fumes generated are so copious, expensive facilities are commonly installed to remove the fumes from the working area. Typical fume removal installations are characterized by high capacity blowers mounted in hoods or ducts which clutter and reduce the area available for workers and equipment and are expensive to operate.

In many metal removal processes, fume removal equipment is not used because the dimension of the metal to be removed exceeds the practical dimensional limits of such equipment. Without fume removal facilities, it would be necessary to reduce the rate of metal removal to a point where fumes are not generated in harmful and annoying amounts. This point varies with cutting parameters, but in general it has been found that the rate of fume generation is constant to some value as the metal removal rate increases, and then increases as the metal removal rate continues to increase into the range obtainable with high temperature, high heat intensity processes.

It is, therefore, the primary object of this invention to provide an inexpensive and expedient process for the suppression of fumes generated by metal removal processes which will not reduce metal removal rates obtainable with high temperature, high heat intensity processes such as practiced with the plasma-arc torch.

It is another object of this invention to provide an inexpensive and expedient process for the suppression of fumes generated by metal removal processes which does not materially affect the rate of such removal and which dispenses with the need for expensive fume removal equipment.

These and other objects, features and advantages of this invention will become more apparent from the following description, appended claims and drawings in which:

According to the present invention there is provided an improvement in metal removal processes of the type wherein relatively large quantities of fumes are generated, such as in the metal cutting by the plasma-arc process, where a high temperature, high heat intensity effluent is used to remove metal. The improvement comprises the addition of a coolant to a fume suppression zone to cool the metal which has been removed from the workpiece. The cooling effects the suppression of the fumes which would otherwise be generated.

For purposes of understanding the mechanism and purport of the instant invention, it is convenient to define a fume generation zone and a fume suppression zone. The fume generation zone is defined as that portion of space wherein fumes are generated. This zone escapes precise definition owing to the vagaries incident to such parameters as the kind of metal removal process, for example piercing, the metal being removed and the process used in its removal. But in general, if fumes are generated by finely sized high temperature particles oxidizing as they exit from the workpiece, then the fume generation zone is that space where such finely sized particles are at sufficient temperature to react with an oxidizing gas. Within the fume generation zone, there is a fume suppression zone wherein a coolant is introduced to cool the particles of metal which have been removed from the workpiece to a point where oxidation of the particles is substantially eliminated. Because oxidation occurs over a finite time, the fume generation zone and the fume suppression zone are not the same, the latter being contained within the former. Stated in terms of the ultimate object of coolant addition, if the coolant is added after the oxides have formed much of its usefulness is lost because fumes are already formed.

Figure 1:
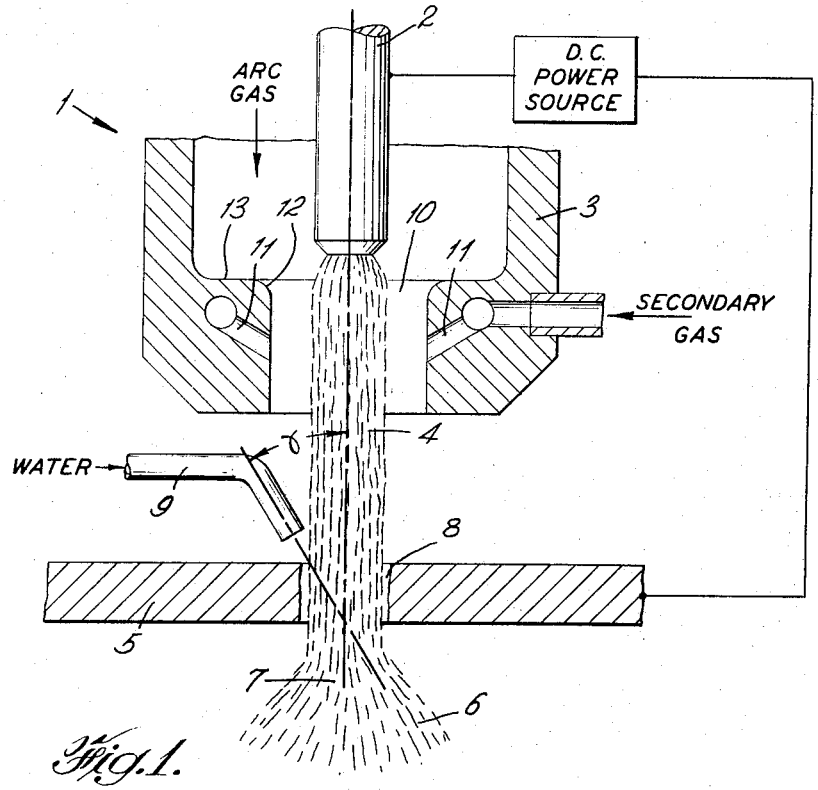
FIGURE 1 is a schematic vertical sectional view of an apparatus capable of producing a plasma-arc which can be used in the practice of the process of the instant invention.

As an aid to the description of the instant invention reference to FIGURE 1 is helpful. An apparatus in the form of a torch for the generation of a plasma-arc is designated by reference numeral 1. The gases which supply the effluent 4 generated by the torch are the arc gas and the secondary gas shown. The secondary gas is introduced into the effluent by means of passages 11. The electrical energy supplied to the effluent 4 is derived by the passage of electric current between torch electrode 2 and a workpiece 5 connected in electric circuit to a power source. As the effluent passes through constricted orifice 10 and bears on and removes metal from the workpiece 5, there is created a space 8 formally occupied by the removed metal which is known in the art as a kerf. Without the addition of a coolant as taught by this invention, the removed metal entrained in the effluent 7 leaving the workpiece would generate fumes in a fume generation zone, which fumes would fan out to form an envelope 6.

It has been found that the fume suppression zone is not coterminous with the portion of the workpiece to be or which is actually being removed, that is, the fume suppression zone is not within the cutting zone. The fume suppression zone is in the space proximate to where removed metal exits from the confines of the workpiece and within the effluent leaving the workpiece. Therefore, the addition of a coolant, for example water, into such space will effectively suppress the fumes which would otherwise be generated.

In preferred practice, the coolant, preferably water, will be introduced directly into the fume suppression zone without first contacting the cutting zone. This is necessary to avoid possible deleterious effects to the metal removal rate and cut quality. If the coolant actually enters the cutting zone, the temperature of such zone may be reduced for a sufficient time to slow the rate of metal removal. Moreover, the coolant in the cutting zone may sufficiently cool the metal which is being removed to cause the creation of dross or metal accumulation on the boundaries of the cutting zone.

As shown in FIGURE 1, direct coolant addition into the fume suppression zone can be accomplished by means of a hollow tube 9 cooperating with torch 1. Such a tube is preferably responsive to the movement of the torch, following the torch as it progresses in relation to the workpiece 5. The tube is behind the advancing effluent and discharges coolant through the developed kerf directly into the fume suppression zone; which zone is immediately below the workpiece and within the effluent. The tube lies in a plane defined by the longitudinal axis of the effluent and the lengthwise axis of the kerf. The tube is oriented at an angle α from the longitudinal axis of the effluent. The axis of the tube, which corresponds to the direction of coolant flow, is tilted at an angle α from the longitudinal axis of the torch in order that the coolant penetrate into the fume suppression zone. The amount of coolant need not be great as will be observed in the case of water expressly in the examples. The stream of coolant must have sufficient inertia to penetrate into the fume suppression zone. The velocity of the coolant, therefore, will vary with the intensity of the effluent issuing from the workpiece.

While it is preferred to introduce coolant directly into the fume suppression zone, in order to avoid reduction in metal removal rates and possible deleterious effects on the quality of the workpiece, it is not necessary in the practice of this invention. All that must be done to suppress fumes is to introduce coolant into the fume suppression zone. This can be accomplished indirectly by any of a number of means exemplified here in conjunction with the torch. For example, by directing a stream of water ahead of the advancing effluent of the torch, it has been found that the water will reach the fume suppression zone by aspiration into the effluent. Another method of introducing water by aspiration into the fume suppression zone is by trickling water off the nozzle 3 of the torch 1. In addition, water introduced into the gas stream before the point where such stream becomes a part of the effluent or even directly into the effluent is also effective.

Figure 2:
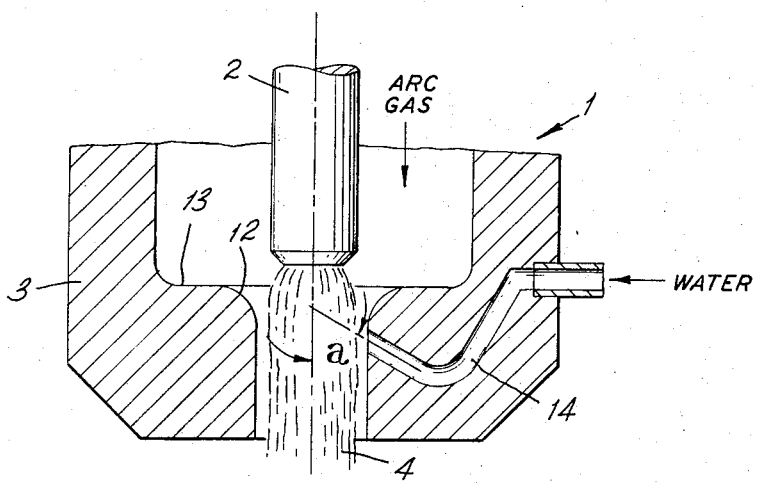
FIGURE 2 is a schematic vertical sectional view of the nozzle of the apparatus shown in FIGURE 1 with a modification which can be used for the practice of a specific embodiment of the process of the instant invention.

Coolant introduction directly into the effluent 4 is illustrated in FIGURE 2. As in FIGURE 1, the effluent gases are composed of the arc gas and secondary gas. In this embodiment of the invention, a coolant, for example water, is introduced through coolant passage 14 within nozzle 3. In preferred practice coolant will be introduced up into the effluent as shown. That is, the stream of coolant will have a velocity component opposite that of the effluent 4. The reason for this particular orientation of the coolant passage relative to the effluent is to provide for the entrainment of the coolant in the effluent and to afford convenient monitoring of coolant flow. If the coolant is introduced with a velocity component in the same direction as the effluent, it will tend to be forced out of the coolant passage by the relatively low pressure in and surrounding the effluent thereby reducing the controllability of its introduction. In short, it is very desirable to provide a means for urging the coolant back into the coolant passage to provide positive control of its flow and this embodiment conveniently supplies the means.

With the particular adaptation of this invention illustrated in FIGURE 2, several factors must be taken into account before metal removal and torch operating conditions are optimized. Initially, water injection into the effluent must be monitored such that water does not reach and attack the torch electrode which normally has a low corrosive resistant tungsten insert. This can be accomplished by using the minimum amount of water necessary to effect fume suppression. Another means for controlling electrode attack is to introduce the water into the effluent at a point as far as is practical from the torch electrode.

The angle between the direction of the effluent and the water passage, indicated as angle α in FIGURE 2, determines the velocity component of water injected into the effluent in a direction paralleling the longitudinal axis of the effluent. If this angle is too small, water will tend to find the electrode and the tungsten insert. It has been found that under most conditions, an angle of approximately 70° avoids the problem of electrode attack while at the same time effecting satisfactory aspiration of the water into the effluent.

In addition, water can cause secondary arcing between the torch electrode 2 and the nozzle 3. This can be eliminated by minimizing water addition to that amount necessary to suppress the fumes.

Metal removal rates approach the maximum heretofore obtainable while at the same time maintaining excellent fume suppression when coolant addition is at a minimum. That is, the minimum amount of coolant addition necessary to suppress fumes to a satisfactory level will result in near if not maximum cutting speeds otherwise available. Dross is also minimized with minimum amounts of coolant addition.

As indicated above, indirect coolant addition into the fume suppression zone is accompanied by problems which do not obtain with the direct introduction of coolant. The considerations which are applicable to coolant addition directly into the effluent, discussed above, generally obtain when indirect coolant addition to the fume generation zone is accomplished by other methods. For example, when a coolant such as water is introduced into the arc gas stream before it is integrated into the effluent, it might attack the tungsten normally associated with the torch electrode 2. Care must be exercised, therefore, to introduce the coolant into the arc gas stream at a point and under conditions where it will not attack the torch electrode's associated tungsten. This can be accomplished by limiting the amount of water introduced to the minimum required to suppress fumes and by not directing the water into the arc gas at a point where it might impinge on the tungsten insert. Furthermore, when water is introduced into the fume generation zone by trickling a stream of water down the side of a plasma arc torch, the torch must be maintained in a generally vertical attitude in order that the water actually becomes aspirated in the effluent.

As was previously indicated, the most important consideration in the indirect addition of coolant to the fume suppression zone is its effect on metal removal rates and cut quality. The amount of coolant added is preferably as small as is consonant with fume suppression in order to maintain high cutting rates and to minimize or eliminate bottom dross on the workpiece.

Water is the preferred coolant for both direct and indirect coolant addition to the fume suppression zone. Water has a high specific heat and, of course, is inexpensive and readily available. Other coolants include carbon dioxide and nitrogen. Preferably, the coolant is introduced to the fume suppression zone in a liquid state in order to provide the cooling effect associated with the heat of vaporization.

EXAMPLE I

Tests were made to determine feasibility of direct water injection into the fume suppression zone as a means for suppressing fumes that would have normally been generated in high temperature, high heat intensity metal removal processes. The instrument used to cut the workpiece was a torch which generated a plasma-arc characterized and operated under the following conditions: the nozzle orifice was of a diameter $\frac{1}{8}$ inch; the gases used in supplying the effluent were oxygen and nitrogen introduced at flow rates of 75 cubic feet per hour and 150 cubic feet per hour respectively; the torch was operated at 275 amperes straight polarity direct current at 150 volts and with a transferred arc. The workpieces were $\frac{1}{2}$-inch carbon steel plates. The cutting rate was 80 inches per minute and the cuts were through the plates. Water was introduced at a rate of 0.3 gallon per minute directly and continuously into the fume suppression zone which was in a space about $\frac{1}{8}$ to $\frac{1}{4}$ inch below the advancing bottom leading edge of the kerf and within the effluent leaving the workpiece. The water was introduced by means of a small tube which was oriented at 60° to the axis of and behind the advancing torch and responded to the movement of the torch. The minimum inside diameter of the tube was varied from 0.045 to 0.095 inch in order to vary the velocity of the water jet. The fumes were minimized without affecting the rate of metal removal or the quality of the cut. The changes in the inside diameter of the water tube did not affect fume suppression inasmuch as the water has sufficient inertia in both cases to reach the fume suppression zone.

EXAMPLE II

A nozzle was adapted for all material purposes as shown in FIGURE 2 in order to introduce water directly up into the effluent. The diameter of the constricted orifice was $\frac{5}{32}$ of an inch and the length of the passage defined by such orifice was $\frac{7}{16}$ of an inch. The inside terminus of the water passage was just below the round, shown by reference numeral 12 in FIGURE 2, in the nozzle leading into the constricted orifice which corresponded to a distance of $\frac{1}{8}$ of an inch below the inside flat, shown by reference numeral 13 in FIGURE 2, of the nozzle. The angle between the water passage and the lengthwise axis of the effluent was 67°. The cutting speed was 45 inches per minute. The workpieces were one inch carbon steel plates. The torch generated a plasma-arc and was operated at 180 volts straight polarity direct current with a transferred arc at 460 amperes. The secondary gas was oxygen introduced at a static pressure of 35.5 p.s.i.g. while the arc gas was nitrogen introduced at 170 cubic feet per hour (calculated at standard temperature and pressure). Cuts were made with and without water addition. Without water addition, heavy dense brown fumes were generated. With water addition, at the rate of 30 milliliters per minute, the fumes were minimized.

Table I below compares the maximum recommended cutting speeds on the indicated workpieces with the point of minimum fume generation, both without water addition, with the maximum cutting speed practical under the conditions enumerated with water addition. The cutting torch used developed a plasma-arc and was operated on straight polarity direct current with a transferred arc. The workpieces were standard carbon steel plates. Water was trickled down the side of the nozzle of the torch and aspirated into the torch effluent whereupon it reached the fume suppression zone. The gases used to supply the effluent of the torch are listed in percents by volume. The quantity of water added was approximately 75 to 150 milliliters per minute. It is readily apparent from Table 1, that water addition materially increases the cutting speeds obtainable for a given amount of fume generation.

TABLE I

| Plate thickness (inches) | $\frac{1}{2}$ | 1 |
| --- | --- | --- |
| Plasma Arc Torch Orifice Diameter (inches) | $\frac{1}{8}$ | $\frac{5}{32}$ |
| Standard Maximum Cutting Speed Without Water (inches per minute): | | |
| Air | 90–100 | 50 |
| $33\frac{1}{3}$% Oxygen; $66\frac{2}{3}$% Nitrogen | 90–100 | 50 |
| 90% Nitrogen, 10% Hydrogen | 60 | 35 |
| Minimum Fume Cutting Speed Without Water (inches per minute): | | |
| Air | 35–50 | 25–30 |
| $33\frac{1}{3}$% Oxygen, $66\frac{2}{3}$% Nitrogen | 30 | 16 |
| 90% Nitrogen, 10% Hydrogen | 60 | 27 |
| Maximum Practical Cutting Speed With Water Addition. Fume Generation Rate Equal to That in Minimum Fume Cutting Speed Without Water (inches per minute): | | |
| Air | 60 | [1] 40 |
| $33\frac{1}{3}$% Oxygen, $66\frac{2}{3}$% Nitrogen | 60 | 30 |
| 90% Nitrogen, 10% Hydrogen | 60 | 35 |

[1] Water flow 30 milliliters per minute.

Except as herein noted under the operating conditions and with the apparatus described with reference to Table I, tests were run to determine the effect of water addition rate on metal removal rate. Utilizing approximately $33\frac{1}{3}$ volume percent oxygen as the secondary gas and $66\frac{2}{3}$ volume percent nitrogen as the arc gas, cuts were made on one inch carbon steel workpieces. The results are tabulated in Table II below:

TABLE II

| Water addition rate (milliliters per minute): | Cutting rate (inches per minute) |
| --- | --- |
| 75–100 | 30 |
| 35 | 35 |
| 10 | 45 |

At all the flow rates enumerated above in Table II, the fumes which would normally have been generated were minimized. It was observed that reducing the flow rate of water reduced the amount of bottom dross (material accumulation) formed on the workpiece over that experienced at higher flow rates. The bottom dross formed at low flow rates were readily removable from the workpiece.

The foregoing tables and examples are for the purpose of illustration and should not be construed as limitations on the present invention.

While the process of this invention has been described with reference to a specific apparatus, it is not intended that the invention be limited thereto. For example, the spirit and scope of the appended claims cover high energy, high heat intensity material removal processes such as iron powder metal cutting wherein fumes are generated. Moreover, the term "water" is to be read as including water in its solid and vapor as well as liquid state.

What is claimed is:

1. A metal removal process comprising the steps of:

introducing a gas into an electric-arc to combine with the electric-arc to form a plasma;

constricting the plasma to form an effluent characterized by its stability, high inertia, high energy per unit area and relatively high temperature;

subjecting a workpiece to the effluent to remove metal therefrom, such metal being in relatively small particles; and introducing a coolant into a fume suppression zone to cool the metal which has been removed from the workpiece, the coolant effecting the cooling of the particles without appreciably oxidizing the particles and added in sufficient amounts to substantially eliminate the fumes which would otherwise be generated.

2. The improvement claimed in claim 1 wherein the coolant is water.

3. The improvement claimed in claim 1 wherein the coolant is added to the fume suppression zone by introducing the coolant directly into such zone without first contacting the workpiece.

4. The improvement claimed in claim 3 wherein the coolant is water.

5. The improvement claimed in claim 1 wherein the coolant reaches the fume suppression zone indirectly by introducing the coolant up into the effluent before the effluent bears on the workpiece such that a velocity component of the coolant is parallel to but in the opposite direction from the velocity of the effluent.

6. The improvement claimed in claim 5 wherein the coolant is water.

7. An improvement in the metal removal processes wherein a high temperature, high heat intensity electric arc effluent bears on a cutting zone on a workpiece and effects the removal of metal from the cutting zone, the removed metal developing a kerf, and the removed metal exits from the cutting zone in relatively small particles at relatively high temperatures, the improvement comprising: introducing a coolant into a fume suppression zone to cool the particles without appreciably oxidizing the particles and in sufficient amounts to substantially eliminate the fumes which would otherwise be generated, the fume suppression zone being proximate to the leading edge of the kerf closest to where the particles exit from the cutting zone and slightly removed from the cutting zone, whereby fumes which would otherwise be generated are substantially suppressed.

8. The improvement as claimed in claim 7 wherein the coolant is introduced directly into the fume suppression zone without contacting the cutting stone.

9. The improvement as claimed in claim 8 wherein the coolant is water.

10. The improvement as claimed in claim 7 wherein the coolant reaches the fume suppression zone indirectly by introducing the coolant up into the effluent before the effluent bears on the workpiece such that a velocity component of the coolant is parallel to but in opposite direction from the velocity of the effluent.

11. The improvement as claimed in claim 10 wherein the coolant is water.

References Cited

UNITED STATES PATENTS 2,892,699   6/1959   Austin et al. _____ 75—45

HYLAND BIZOT, *Primary Examiner.*

DAVID L. RECK, *Examiner.*

W. W. STALLARD, *Assistant Examiner.*